United States Patent
Zimmermann et al.

(10) Patent No.: US 6,760,358 B1
(45) Date of Patent: Jul. 6, 2004

(54) LINE-NARROWING OPTICS MODULE HAVING IMPROVED MECHANICAL PERFORMANCE

(75) Inventors: Kay Zimmermann, Bovenden (DE); Konstantin Aab, Kassel (DE); Matthias Kramer, Göttingen (DE); Marcus Serwazi, Gleichen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 10/141,625

(22) Filed: May 7, 2002

Related U.S. Application Data

(60) Provisional application No. 60/327,568, filed on Jun. 7, 2001.

(51) Int. Cl.[7] ............................................... H01S 3/08
(52) U.S. Cl. ......................... 372/101; 372/92; 372/98
(58) Field of Search .......................... 372/92, 98, 101, 372/9; 357/196, 197, 223

(56) References Cited

U.S. PATENT DOCUMENTS

| | | | | |
|---|---|---|---|---|
| 3,609,588 A | * | 9/1971 | McKnight | 331/94.5 |
| 3,711,788 A | * | 1/1973 | Forkner | 331/94.5 |
| 5,331,651 A | * | 7/1994 | Becker et al. | 372/32 |
| 6,008,925 A | * | 12/1999 | Conemac | 359/204 |
| 6,094,448 A | | 7/2000 | Fomenkov et al. | 732/102 |
| 6,101,211 A | | 8/2000 | Wakabayashi et al. | 372/102 |
| 6,298,080 B1 | | 10/2001 | Heist et al. | 372/99 |
| 6,597,462 B2 | | 7/2003 | Kramer et al. | 356/519 |
| 2002/0006148 A1 | | 1/2002 | Govorkov et al. | 372/55 |
| 2002/0141471 A1 | | 10/2002 | Aab et al. | 372/57 |

OTHER PUBLICATIONS

In re U.S. Provisional Patent Appln. No. 60/430,839, filed Dec. 3, 2002, by Peter Lokai et al., with copy of return receipt postcard, 38 pages in length.
In re U.S. Provisional Patent Appln. No. 60/439,080, filed Jan. 8, 2003, by Sergei V. Govorkov, with copy of Official Filing Receipt mailed Mar. 5, 2003, 28 pages in length.

* cited by examiner

*Primary Examiner*—Paul Ip
*Assistant Examiner*—Leith Al-Nazer
(74) *Attorney, Agent, or Firm*—Stallman & Pollock LLP

(57) ABSTRACT

An apparatus for adjusting an orientation of an optical component mounted within a laser resonator with suppressed hysteresis includes an electromechanical device, a drive element, and a mechano-optical device coupled to the mounted optical component. The drive element is configured to contact and apply a force to the mechano-optical device in such a way as to adjust the orientation of the mechano-optical device, and thereby that of the optical component, to a known orientation within the laser resonator. The optical component is mounted such that stresses applied by the mount to the optical component are homogeneous and substantially thermally-independent.

40 Claims, 8 Drawing Sheets

LINE-NARROWING OPTICS MODULE HAVING IMPROVED MECHANICAL PERFORMANCE

PRIORITY

This application claims the benefit of priority to United States provisional patent application No. 60/327,568, filed Jun. 7, 2001.

BACKGROUND OF INVENTION

1. Field of Invention

The present invention relates to an apparatus for adjusting the spectrum and bandwidth of a laser light source.

2. Description of Related Art

Excimer lasers are currently used as light sources for the integrated circuit lithography industry. These lasers produce a beam having a narrowband spectrum with a bandwidth of less than 1 pm at deep ultraviolet (DUV) wavelengths of 248 nm for a KrF laser or 193 nm for an ArF laser. Molecular fluorine lasers emit around 157 nm and will become more widely used for vacuum ultraviolet (VUV) lithography for producing even smaller structures on silicon wafers. There also exist semi-narrowband excimer lasers with bandwidths of more than 10 pm, for which the same principles hold. To produce extremely narrow-band UV light of low divergence and of a high spectral purity, a multitude of dispersive optical components may be utilized such as prisms, optical diffraction gratings and etalons or other interferometric devices. In general, adjustments to the wavelength and/or bandwidth of UV light emitted by these lasers may be made by using an electromechanical device ("EMD"), which in some way moves the position or changes the surface curvature of an optical component ("OC") in the resonator of the excimer or molecular flourine laser. The EMD is coupled to a mechano-optical device ("MOD") which transfers the motion of the EMD to the optical component, wherein the OC may be typically fixed to the MOD. Thus, when the optical component is moved, characteristics of the UV light output from the laser are changed.

In the normal operation mode of a DUV or VUV lithography laser system, it is desired to keep the laser wavelength substantially constant and the bandwidth (or another spectral property like full width at $1/e^2$, spectral purity, or an integral or differential quantity) below a specified value. These quantities can be monitored and controlled using a spectrometer such as an etalon spectrometer, grating spectrometer, prism spectrometer or other optical spectrometers in conjunction with a processor in a feedback loop including means for adjusting spectral parameters to desired values.

The typical temporal exposure pattern for the production of semiconductor chips is produced with pulse bursts of, e.g., 200 laser pulses and short breaks of 100 ms between them. A complete sequence may include 60 bursts and breaks, which is followed by a more or less long burst break of, e.g., 5 seconds. For lithography systems it is desired to keep the quality of the laser radiation under control for each pulse of the burst sequence. It is desired to have a lithography system wherein the wavelength of emission may be changed, particularly within a long burst break, over a wide range of up to 300 pm. This is to adapt the lithography system to environmental conditions like pressure and temperature. Furthermore, changes of wavelength in a small range of up to 0.6 pm without any laser pulses being emitted from the laser during that wavelength change are desired within short burst breaks, i.e. with an open feedback loop. This is to keep the quality of the lithography process under control, as changes in temperature of stepper optics can otherwise result in changes in exposure wavelength at an application process.

The desired tolerance limit of such componentry is extremely low in respect of hysteresis. Maintaining a stable and invariable position of optical elements and mechanical componentry within a defined range is, therefore, greatly desired.

It is further desired that the mounting of the OC be independent of environmental conditions, in particular of possible temperature gradients within the optical component. The demands set out above apply also to elements and componentry in motion during operation. These linear and rotary motions can be very small (e.g., <100 nm:x rad) and are essentially designed to fine tune the entire optical system to a desired wavelength of the UV light. This may result in high acceleration values and it is desired that such values be free of negative influence on the positional stability of the optical elements. Merest inaccuracies already prove undesirable during repeated starts at pre-defined set-points. These set-points can be reference coordinates at which the reference wavelength, for exampled 248.3271 nm, is found. To calculate various operating positions, it is desired that this value be recorded precisely and be maintained reliably. It is further desired that the hysteresis of such motional process be kept very small ensuring that the wavelength drift of the optical assembly is kept as minute as possible.

Spring mount contact pressure plates may be used for securely positioning OCs. A disadvantage is that there is a pointlike exerting of force into the substrates of OCs using this method. Consequently, this may lead to the development of partially irreversible strain birefringence. This causes severe wavefront deformation and striation in the beam profile. Optically acting gratings and etalons having adjustable orientations for controlling the wavelength and bandwidth of emission of the laser may be supported between high surface quality bearings which permit rotation of the OCs. Such systems are susceptible to hysteresis, and it is recognized herein that special consideration should be given to the design of bearing components. Important quantities are diameter of balls, surface quality of bearing components as well as sizing of pressure forces. In general small quantities of silicone-free lubricants are used for lubrication.

When designing components to support OC's, it is recognized herein that special consideration should be given for temperature gradient-dependent changes in length. Such assemblies may be generally very sensitive to temperature fluctuations reacting with play in bearings and thus producing hysteresis effects when adjusting positions and/or orientations of OC's. To a certain degree this is influenced by the breakaway friction of bearing components. This is the force necessary to leave the zone of elastic deformation of the bearing components and to proceed into a rotary, progressive motion.

SUMMARY OF THE INVENTION

The present invention relates to an apparatus for adjusting, with low hysteresis and high repeatability, the wavelength and/or bandwidth of a laser beam by moving an optical component.

In a particular embodiment, an apparatus for adjusting a position of an optical component within a laser resonator with suppressed hysteresis includes an electromechanical device comprising a drive element including a first contact surface, and a mechano-optical device for supporting the optical component including a second contact surface for contacting the first contact surface. The drive element permits adjustment of an orientation of the mechano-optical device by applying a force to the first contact surface, and thereby for adjusting an orientation of the optical component. The first and second contact surfaces are configured such that the drive element transmits a change of position to the mechano-optical device through a rolling contact between the first contact surface and the second contact surface.

In another embodiment, an apparatus for adjusting a position of an optical component within a laser resonator includes an electromechanical device comprising a drive element including a first contact surface, and a mechano-optical device for supporting the optical component including a second contact surface for contacting the first contact surface. The drive element permits adjustment of the position of the mechano-optical device by applying a force to the first contact surface, and thereby the mechano-optical device adjusts the position of the optical component. The apparatus also includes a controller for error correction of the position of the drive element which controls the electromechanical device, and a position measuring device which measures the position of the drive element. A signal feedback loop provides a signal indicative of the position of the drive element to the controller from the position measuring device. The controller controls the electromechanical device which adjusts the drive element based on the signal provided by the feed back loop.

In another embodiment, an apparatus for adjusting a position of an optical component within a laser resonator includes an electromechanical device comprising a drive element including a first contact surface, and a mechano-optical device for supporting the optical component including a second contact surface for contacting the first contact surface. The drive element permits adjustment the position of the mechano-optical device by applying a force to the first contact surface. The mechano-optical device adjusts the position of the optical component. The apparatus further includes a controller for error correction of the position of the mechano-optical device for controlling the electromechanical device, and a position measuring device which measures the position of the mechano-optical device. The controller and the position measuring device are connected in a feedback loop. The position measuring device provides a signal indicative of a position of the mechano-optical device. The controller controls the electromechanical device based on the signal from the position measuring device, such that the electromechanical device adjusts a position of the drive element and the drive element adjusts a position of the mechano-optical device based on a control signal from the controller.

According to another embodiment, an apparatus for adjusting a position of an optical component within a laser resonator with suppressed hysteresis includes a housing for mounting the optical component therein, and an electromechanical device including a drive member configured to travel in an approximately linear direction, a mechano-optical device rotatably coupled to the housing, and a contact point where the drive member and the mechano-optical device are in contact with each other. The drive member and mechano-optical device are configured for directing the contact point to follow a substantially tangential path relative to the rotation of the mechano-optical device.

In another embodiment, an apparatus for adjusting a position of an optical component within a laser resonator with suppressed hysteresis includes a mechano-optical device for supporting an optical component, and an electromechanical device comprising a drive element coupled to the mechano-optical device by an elastic material. The drive element is moved by the electromechanical device for adjusting an orientation of the mechano-optical device and thereby for adjusting an orientation of the optical component.

According to a further embodiment, an apparatus for adjusting an orientation of an optical component mounted within a laser resonator includes an optical mount for mounting the optical component thereon; and a mechano-optical device coupled by an elastic material to the optical mount. The mechano-optical device is rotationally adjustable for adjusting the orientation of the optical component within the laser resonator.

In another embodiment, an apparatus for adjusting an orientation of an optical component mounted within a laser resonator includes a mechano-optical device for mounting the optical component thereon. The mechano-optical device is rotationally adjustable for adjusting the orientation of the optical component within the laser resonator. The mechano-optical device is rotatable at least approximately about a center of gravity of the combination of the optical component and mechano-optical device.

In a further embodiment, an apparatus for adjusting a position of an optical component within a laser resonator with suppressed hysteresis includes a mechano-optical device for supporting the optical component and having a contact segment, an electromechanical device comprising a drive element coupled to the mechano-optical device, wherein the drive element is moved by the electromechanical device for adjusting an orientation of the mechano-optical device and thereby for adjusting an orientation of the optical component, and at least one spring for coupling the drive element to the contact segment of the mechano-optical device.

In another embodiment, an apparatus for adjusting a position of an optical component within a laser resonator with suppressed hysteresis includes a mechano-optical device for supporting an optical component, and an electromechanical device comprising a drive element magnetically coupled to the mechano-optical device. The drive element is moved by the electromechanical device for adjusting an orientation of the mechano-optical device and thereby for adjusting an orientation of the optical component.

In a further embodiment, an apparatus for adjusting a position of an optical component within a laser resonator with suppressed hysteresis includes a mechano-optical device for supporting the optical component and having an adjustable orientation for adjusting an orientation of the optical component. The optical component is supported on the mechano-optical device by a roller bearing comprising a ruby ball bearing.

In another embodiment, an apparatus for mounting an optical component within a laser resonator includes a housing disposed within the laser resonator and having the optical component mounted therein, the optical component having an axis of rotation defined therethrough, a first ball bearing coupled to a first surface of the optical component, a second ball bearing coupled to a second surface of the optical component, the first and second ball bearings being substantially aligned along said axis of rotation, and a leaf spring coupled to the housing and also to one of the first and second ball bearings for controlling a spacing between the first and second ball bearings such that the spacing is adjustable to a changing dimension of the optical component as a temperature of the optical component changes.

In another embodiment, an apparatus for mounting an optical component within a laser resonator includes a housing disposed within the laser resonator and having the optical component mounted therein, the optical component having an axis of rotation defined therethrough, a first ball bearing coupled to a first surface of the optical component, a second ball bearing coupled to a second surface of the optical component, the first and second ball bearings being substantially aligned along the axis of rotation, and at least one spring coupled to the housing and also to one of the first and second ball bearings for controlling a spacing between the first and second ball bearings such that the spacing is adjustable to a changing dimension of the optical component as a temperature of the optical component changes.

In a further embodiment, an optical mount for mounting an optical component thereon and having an adjustable orientation within a laser resonator with suppressed hysteresis includes a housing for mounting the optical component thereto, a leaf spring and a leaf spring clamp coupled to the housing, and a first ball bearing and a second ball bearing for rotatably supporting the optical component therebetween. The first ball bearing is supported between the leaf spring and the leaf spring clamp in a direction offset from an axis of rotation of the optical component substantially defined through the first and second ball bearings.

In a further embodiment, a hysteresis reducing optical apparatus for a laser system includes an optical component coupled to an upper roller ball and to a lower roller ball, and a housing including a base, a leaf spring clamp and a clamp. The leaf spring attaches the upper rollerball in a sideways fashion to the housing. The clamp attaches the lower rollerball to the housing in a sideways fashion. The clamp fixes the lower bearing in a stationary manner.

According to another embodiment, an optical mount for mounting an optical component thereon within a laser resonator includes a base for supporting the optical component at a first surface, a plano-curved segment for supporting the optical component at a second surface opposite the first surface, the plano-curved segment supporting the optical component by contacting the second surface of the optical component with a planar surface of the plano-curved segment, a leaf spring contacting a curved surface of the plano-concave segment for controlling a force exerted on the optical component by the planar surface of the plano-curved segment, and at least one spring for coupling the leaf spring to the base for controlling a spacing between the first and second ball bearings such that the spacing is adjustable to a changing dimension of the optical component as a temperature of the optical component changes.

An apparatus for adjusting an orientation of an optical component mounted within a laser resonator with suppressed hysteresis includes an optical mount for mounting the optical component thereon, and an electro-mechanical device coupled by a solid link to the optical mount for adjusting an orientation of the optical component within the laser resonator. The solid link is elastically deformable for providing the suppressed hysteresis.

The features mentioned in the subclaims relate to further developments of the solution according to the invention. Further advantages of the invention are found in the following detailed description.

BRIEF DESCRIPTION OF THE DRAWINGS

Below, the present invention will be described in greater detail based on embodiments, with reference to the attached drawings.

FIG. 16b shows a side view of the device of FIG. 16a.

DETAILED DESCRIPTION OF THE PREFERRED EMBODIMENTS

Those of ordinary skill in the art will realize that the following description of the present invention is illustrative only and not in any way limiting. Other embodiments of the invention will readily suggest themselves to such skilled persons.

Figure 1:
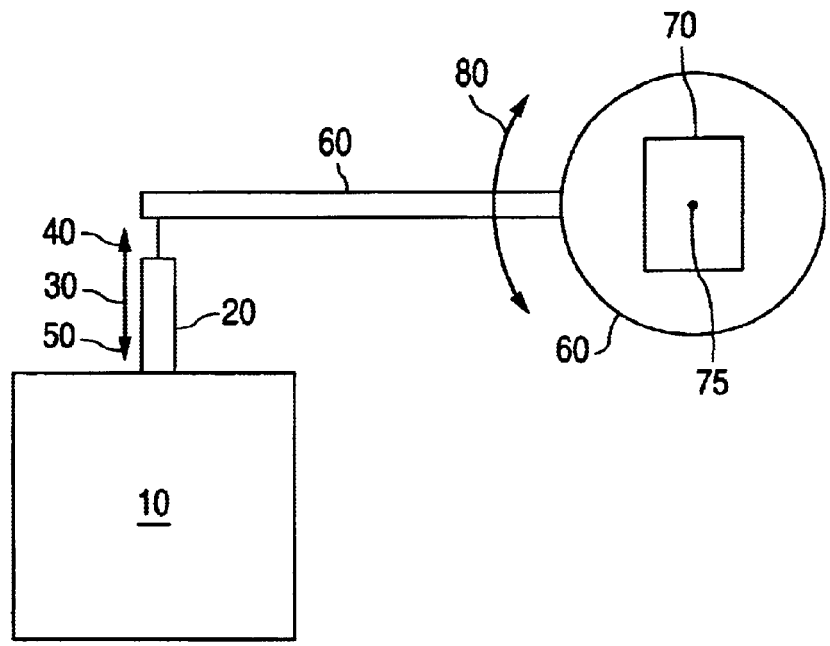
FIG. 1 schematically illustrates an arrangement for adjusting an orientation of an optical component according to a preferred embodiment.

Referring to FIG. 1, the EMD 10 is coupled to a drive element 20. A non-limiting example of an EMD 10 includes an electric motor that has an output element that moves in a linear direction. The EMD 10 is configured to move the drive element 20 back and forth in a linear direction illustrated by the arrow 30. Non-limiting examples of a drive element would be the output element of the EMD 10 and a shaft coupled to the output element of the EMD 10. In FIG. 1, reference numeral 40 indicates the outward direction of the EMD 10 and reference numeral 50 indicates the inward direction of the EMD 10. The drive element 20 is coupled to the MOD 60. The MOD 60 is a device which transfers the motion of the EMD 10 to the OC 70, wherein the OC 70 is preferably contained in MOD 60 and is fixed to the MOD 60. The MOD 60 is coupled to the OC 70 such that the MOD 60 may be rotated by the EMD 10 to rotate the OC 70 preferably about an axis of rotation 75 through a center of gravity of the OC 70. Non-limiting examples of OCs 70 that may be used in these types of optical systems are prisms, optical diffraction gratings and etalons or other interferometric devices having non-parallel and/or non-planar inner reflecting surfaces (see, e.g., U.S. patent application Ser. No. 09/715,803, which is assigned to the same assignee as the present application and is hereby incorporated by reference). The linear movement of the drive element 20 rotates the MOD 60 which in turn rotates the OC 70. The rotation of the MOD 60 and OC 70 are illustrated by arrow 80. Thus, the optical properties of the OC may be tuned according to the rotative position of the OC.

Figure 2:
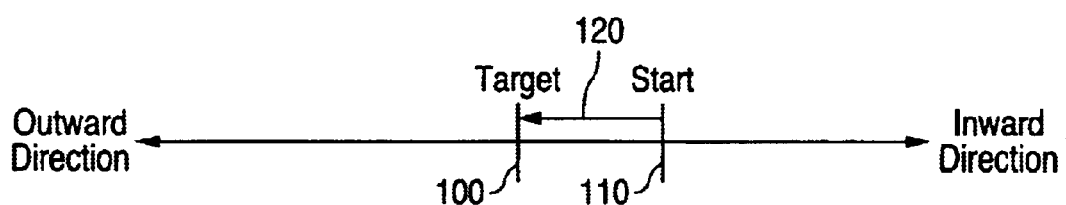
FIG. 2 is an illustration of the movement of the drive element of the EMD.

In a preferred embodiment herein, the OC 70 may be adjusted by having the drive element 20 approach the desired OC 70 position from the same direction. Referring to FIG. 2, reference numeral 100 indicates the target position of the drive element which corresponds to a desired rotation of the OC 70. It is preferred herein to always approach a target position by moving the drive element 20 in the outward direction indicated by the pointing direction of the arrow 120. Thus, reference numeral 110 indicates the starting position of the drive element 20, and in order to approach the target position 100, the drive element moves in an outward direction 120.

Figure 3:
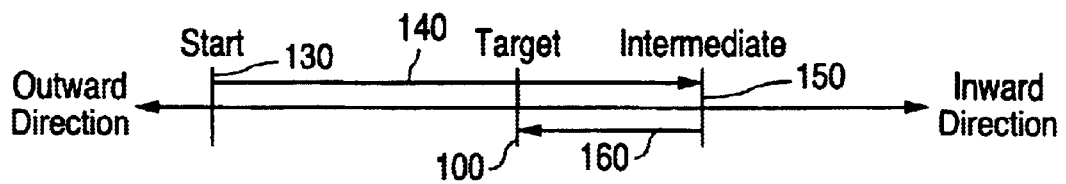
FIG. 3 is an illustration of the movement the drive element of the EMD.

Referring to FIG. 3, if the starting position 130 of the drive element is already outward of the target position 100, then the drive element is preferably first moved in an inward direction as indicated by the pointing direction of the arrow 140 towards and past the target position 100 to an intermediate position 150, where the drive element then moves in an outward direction 160 to the target position where it stops.

This aspect of approaching the target position from the same relative direction, advantageously suppresses positional uncertainty associated with hysteresis in the system, thus allowing for greater accuracy in positioning the OC 70 of FIG. 1 which in turn increases the accuracy in tuning the light source.

Figure 4:
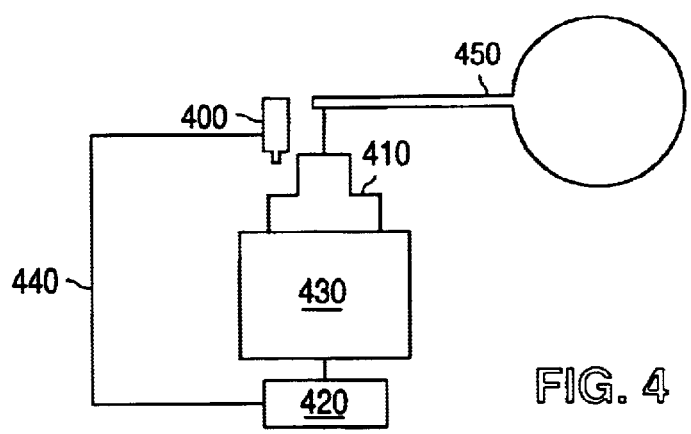
FIG. 4 is a schematic illustrating a PMD measuring the position of the EMD.

Referring to FIG. 4, a position measuring device ("PMD") 400 measures the position of the drive element 410. The PMD 400 provides an electronic signal corresponding to the position of the drive element 410 to a controller 420. The controller controls the EMD 430. The controller 420, thereby through the feedback loop illustrated by the connection 440 controls the EMD 430 and adjusts the position of the drive element 410 to more accurately position the drive element 410, and thereby more accurately positions the MOD 450. Non-limiting examples of controllers include state machines and microcontrollers.

Figure 5:
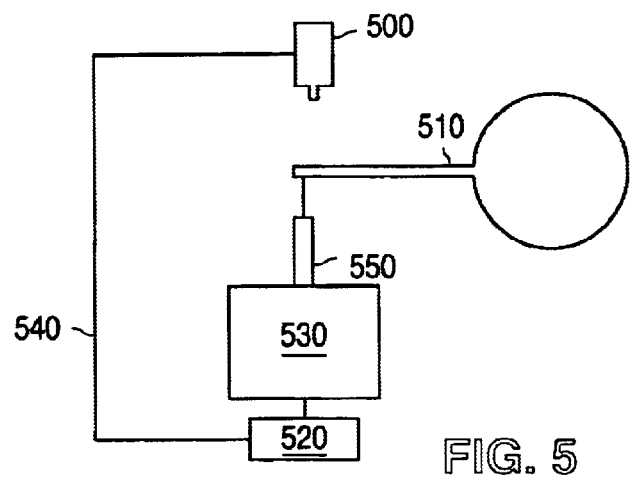
FIG. 5 is a schematic illustrating a PMD measuring the position of the MOD.

Referring to FIG. 5, the PMD 500 measures the position of the MOD 510. The PMD 500 provides an electronic signal corresponding to the position of the MOD 510 to a controller 520. The controller controls the EMD 530. The controller 520, thereby through the feedback loop illustrated by connection 540 controls the EMD 530 which adjusts the position of the drive element 550, which in turn more accurately positions the MOD 510.

Figure 6:
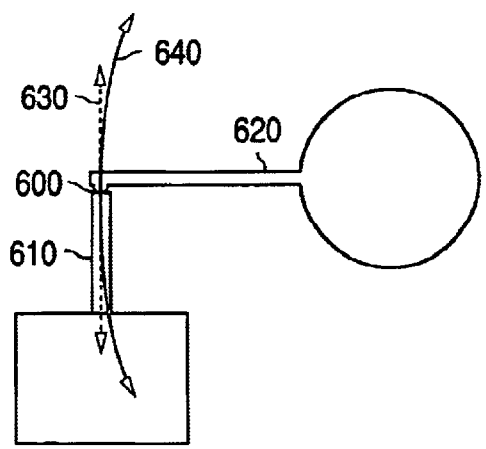
FIG. 6 is a schematic illustrating the linear movement of the drive element and the rotary movement of the EMD.

Referring to FIG. 6, the contact point 600 between the drive element 610 and the MOD 620 is positioned to maximize tangential travel, illustrated by the directional arrow 630, of the contact point 600, thereby reducing side to side sliding of the MOD 620 with respect to the drive element 610 at the contact point 600 about a circumference of travel of the MOD 620 indicated by arc 640. According to a preferred embodiment herein, materials are selected for the contact surfaces that are stiff and have a low surface roughness, thereby reducing the friction at the contact point between the drive element 610 and the MOD 620. It is further preferred to reduce the contact area and sliding between the drive element 610 and the MOD 620 by use of various shapes of the components 610 and 620 at the contact point 600.

Figure 7A:
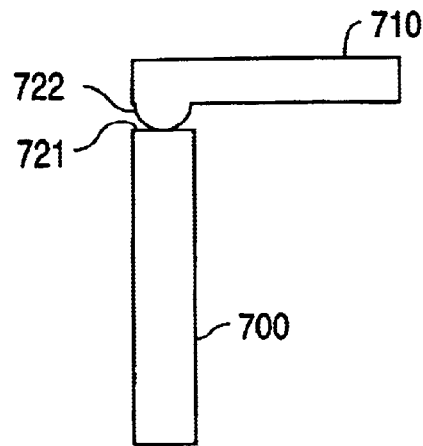
FIGS. 7a through 7f are drawings illustrating the various contact surface geometries between the drive element and the MOD.
Figure 7B:
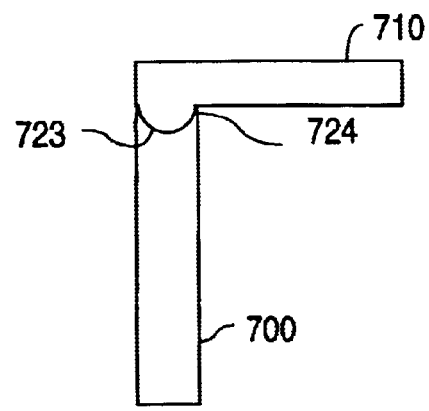
Figure 7C:
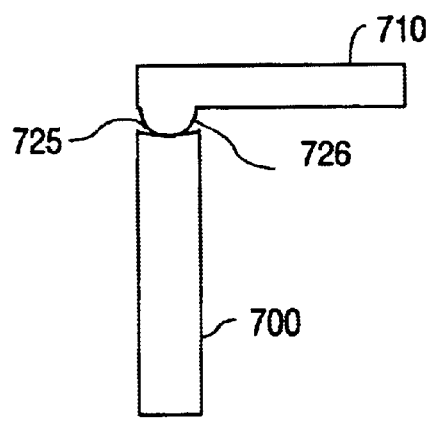
Figure 7D:
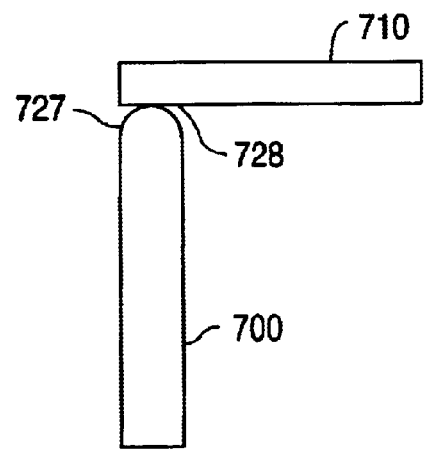
Figure 7E:
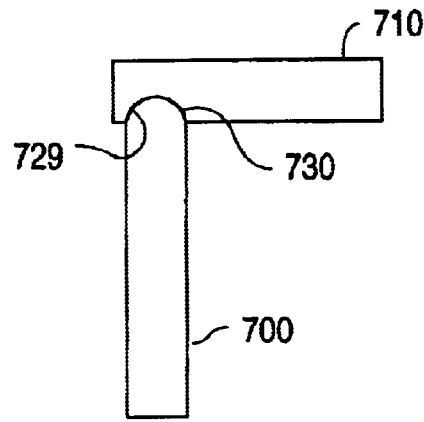
Figure 7F:
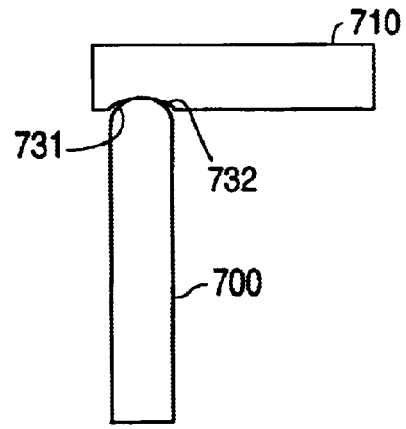

FIGS. 7a–7f show several embodiments wherein a drive element 700 and a MOD 710 (the reference numbers with respect to the drive element 700 and MOD 710 are the same in FIGS. 7a through 7f) contact each other by a rolling contact enabled by advantageous shapes of contact surfaces of the MOD 710 and/or the drive element 700. The drive element 700 shown in FIG. 7a has a planar contact surface 721, and the MOD 710 has a spherical contact surface 722. FIG. 7b shows a drive element with a concave contact surface 723 along with a spherical contact surface 724 on the MOD 710. FIG. 7c illustrates a contact surface wherein the rounded contact surface 726 of the MOD 710 acts to unroll off the contact surface 725 of the drive element 700. FIG. 7d shows a drive element 700 with a spherical contact surface 727 along with a MOD 710 with a planar contact surface 728. In FIG. 7e, the drive element 700 has a spherical contact surface 729, whereas the MOD 710 has a concave contact surface 730. FIG. 7f shows a rounded contact surface 731 on the drive element 700 which unrolls of the contact surface 732 of the MOD 710.

Figure 8:
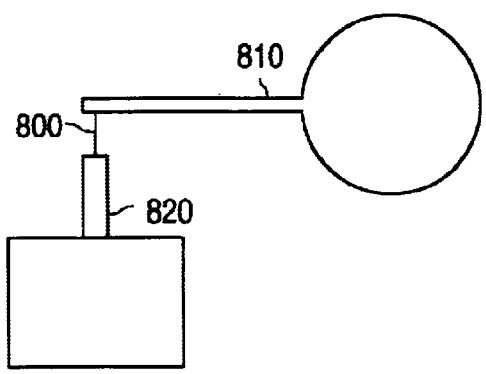
FIG. 8 is an illustration of a solid coupling between the drive element and the MOD.

FIG. 8 shows a coupling 800 between the MOD 810 and the drive element 820. The coupling 800 is a stiff connection with elastic properties. The coupling 800 has some elastic properties in order to compensate for the difference between the linear motion of the drive element 820 and the circular motion of the MOD 810. The coupling 800 may be a wire, a piece of sheet metal or a twisted piece of sheet metal. Using the solid coupling 800 advantageously eliminates friction due to sliding between the contact surfaces of the drive element 820 and the MOD 810.

Figure 9:
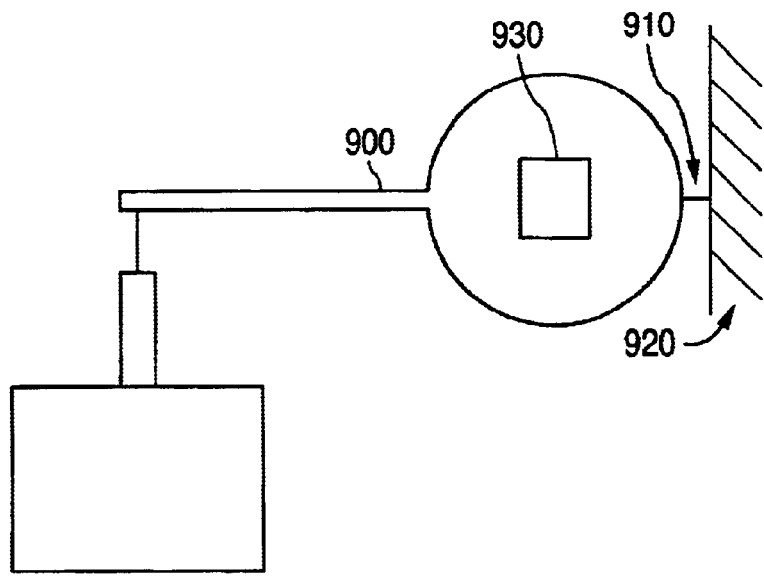
FIG. 9 is an illustration of a solid coupling between the MOD and the OC.

FIG. 9 illustrates another embodiment of a MOD 900 and a solid coupling 910 between the MOD 900 and the housing 920 of the optics module. The solid coupling 910 between the MOD 900 and optics module housing 920 eliminates friction due to bearings that may otherwise be used to hold the OC 930.

It is preferred herein to align the rotation axis of the MOD 900 with the center of gravity of the MOD 900. This prevents unbalance in the system when the MOD 900 is rotated.

Figure 10A:
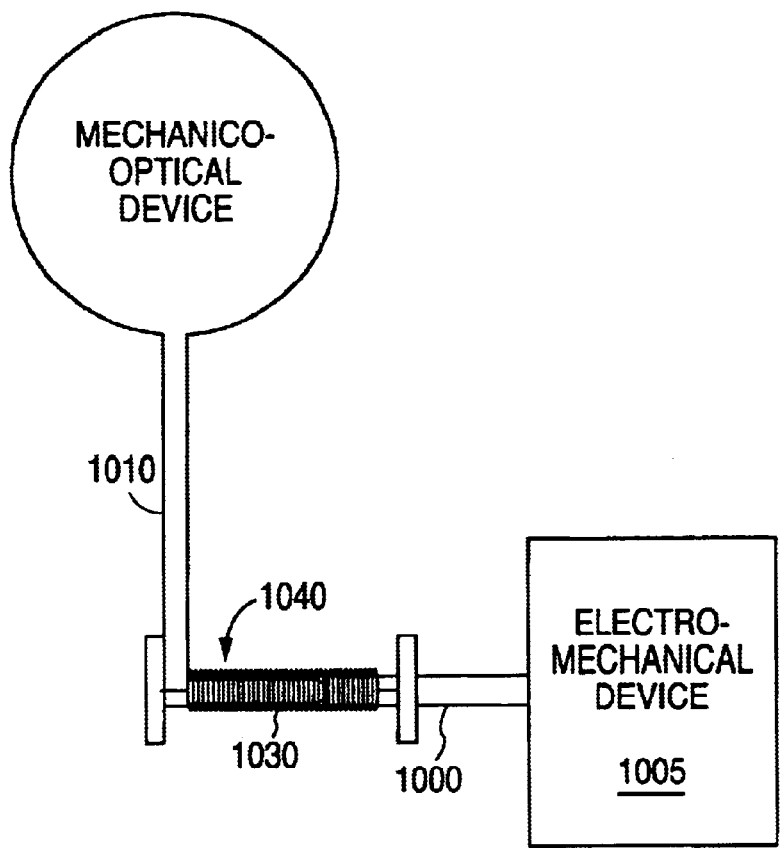
FIGS. 10a and 10b schematically illustrate a spring coupling between the drive element and the MOD.
Figure 10B:
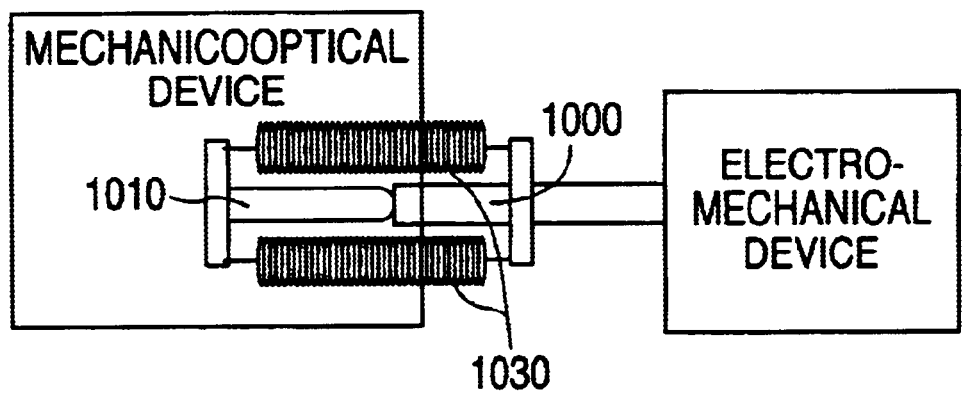

In FIG. 10a, a top view of a EMD 1005 and MOD 1010 system is shown. Drive element 1000 of the EMD 1005 is forced against MOD 1010 by a set of springs 1030 which are attached to both the drive element 1000 and the MOD 1010. The MOD 1010 shown has a specially configured end 1040 for coupling with the spring 1030. In FIG. 10b, a side view of the system of FIG. 10a is shown, where it may be seen that the set of springs 1030 includes an upper and a lower spring, thereby avoiding unbalance caused by the springs 1030 exerting force on the components. Irrespective of what position the drive element 1000 and MOD 1010 are in, the springs exert a constant force on both the drive element 1000 and the MOD 1010, thus suppressing hysteresis as the position of the MOD 1010 is changed.

Figure 11:
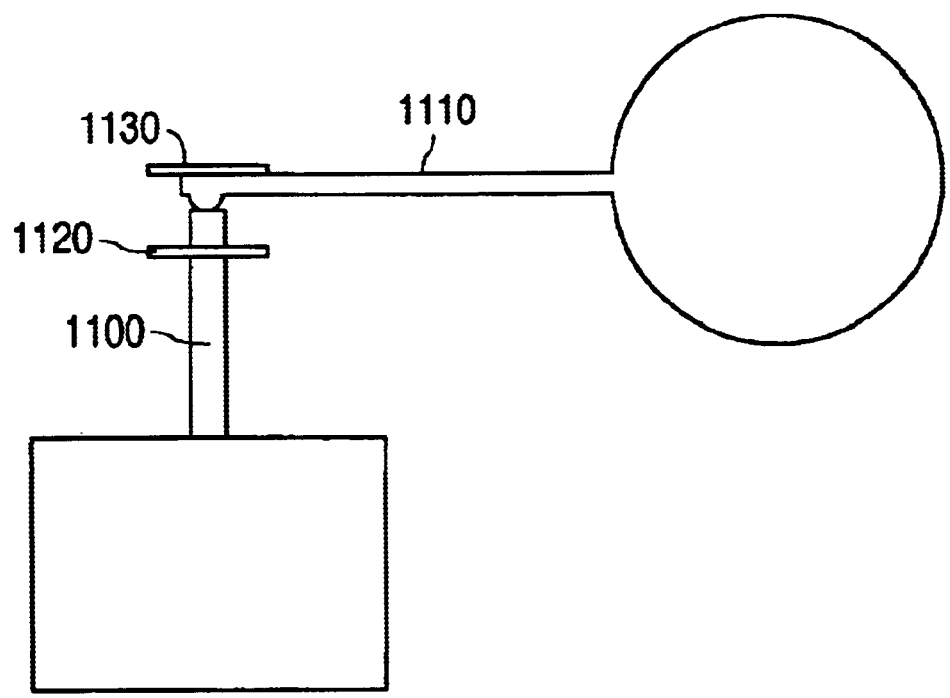
FIG. 11 schematically illustrate a magnetic coupling between the drive element and the MOD.

FIG. 11 shows a drive element 1100 and a MOD 1110. The contact surfaces of the drive element 1100 and the MOD 1110 are kept together by a magnetic coupling between a pair of magnets or a magnet and a magnetic material 1120 and 1130. The elements 1120 and 1130 of this embodiment allow for an equal force above and below and on both sides of the drive element 1100 and MOD 1110, thus avoiding unbalance. The magnetic coupling force is approximately constant despite the position of the drive element 1100 and the MOD 1110, thereby suppressing hysteresis.

The OC of any of the embodiments described herein may be typically supported by a bearing, such as a roller bearing.

This roller bearing may be advantageously made of ruby, which is extremely hard and has a very low coefficient of friction, thereby suppressing hysteresis in the system, due to the lack of friction from the roller bearing. It is also advantageous to fix one end of the ruby roller element because due to the hardness and low coefficient of friction of the ruby, the friction in the system is suppressed and mechanical stability of the system is enhanced.

Figure 12:
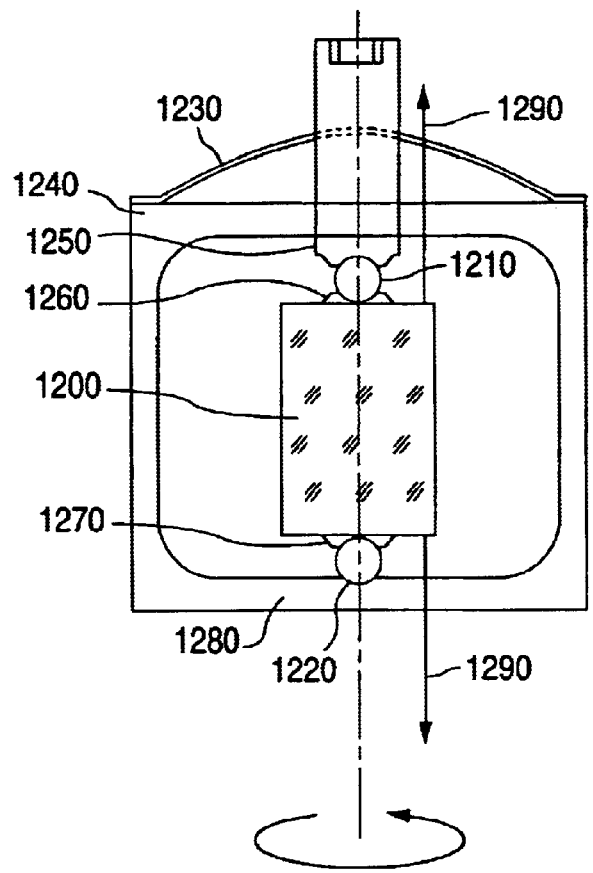
FIG. 12 schematically illustrates a leaf spring element of the design.

It is also preferred herein to improve characteristics of the ball bearing system which supports the optical component by using a limited, constant vertical contact pressure force on the bearing system to reduce play in the bearing, and allow for temperature dependant changes of size in the system. FIG. 12 shows an OC 1200 supported by an upper roller ball 1210, and a lower roller ball 1220. A leaf spring 1230, attached at both a right side and left side to a housing 1240, applies a force to the roller ball 1210 at an upper bearing upper shell 1250, which holds roller ball 1210, through upper bearing lower shell 1260, which holds OC 1200, through lower bearing upper shell 1270, through lower roller ball 1220, and through lower bearing lower shell 1280, as shown. Thermal growth of the OC is illustrated by arrows 1290. Ideally, the rotational axis of the OC 1200 is co-linear with the center of mass of the entire OC/bearing assembly. Further, the axes of the upper and lower bearing elements are substantially aligned to each other to prevent elliptic rather than circular line pressure of the roller balls 1210 and 1220.

Figure 13:
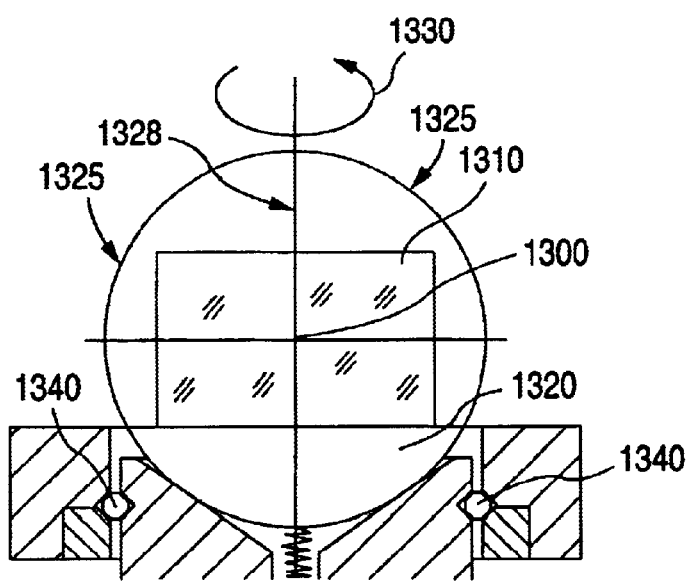
FIG. 13 schematically illustrates a spherical segment table element of the design.

FIG. 13 shows a spherical segment 1320 which serves as a combined bearing and optical support of an OC 1310. The device permits precise adjustment of the OC 1310 around an operating point 1300. The circular portion 1325 shown in FIG. 13 may be a physical shell, e.g., connecting an upper bearing (not shown) that is similar to that described with respect to FIG. 12, or that may be similar to the spherical segment 1320 of FIG. 13, wherein portions of the circular portion 1325 between upper and lower surfaces of the OC 1310 may serve as the housing 1240 of FIG. 12. Alternatively, the circular portion 1325 may be only shown in FIG. 13 to illustrate that the center of curvature of the spherical segment 1320 is at the operating point 1300 approximately centered on the OC 1300. Any desired rotary motion may be executed around the operating point 1300. The OC 1310 to be rotated is mounted on a spherical segment 1320 which doubles as performing a bearing function. As indicated above, the operating point 1300 of the OC 1310 is preferably at, or at least near, a center of curvature of the spherical segment 1320. Rotational adjustment of the OC 1310 about the rotational axis 1328 extending vertically through the operating point 1300 may be achieved by rotating the OC 1310 via the MOD (not shown here, but see FIGS. 1–11 and description thereof above) and the drive element (again, not shown here, but see FIGS. 1–11 and description above) in the direction indicated by the circular arrow 1330. Rotational adjustment in the plane of the paper, or about a rotational axis perpendicular to the plane of the drawing in FIG. 13 and extending through the operating point 1300 may also be achieved by tilting the spherical segment 1320 relative to the horizontal plane upon which the OC 1310 rests in FIG. 13. The rotary motion about the axis 1328 is facilitated by a ring-shaped bearing 1340. As a result of being able to adjust the OC 1310 with each of these degrees of freedom, a light beam traversing the OC 1310 and remaining within an acceptance angle of a laser resonator within which the OC 1310 is being used may have a selected wavelength and its alignment with respect to the optical axis of the resonator can be properly set.

Figure 14A:
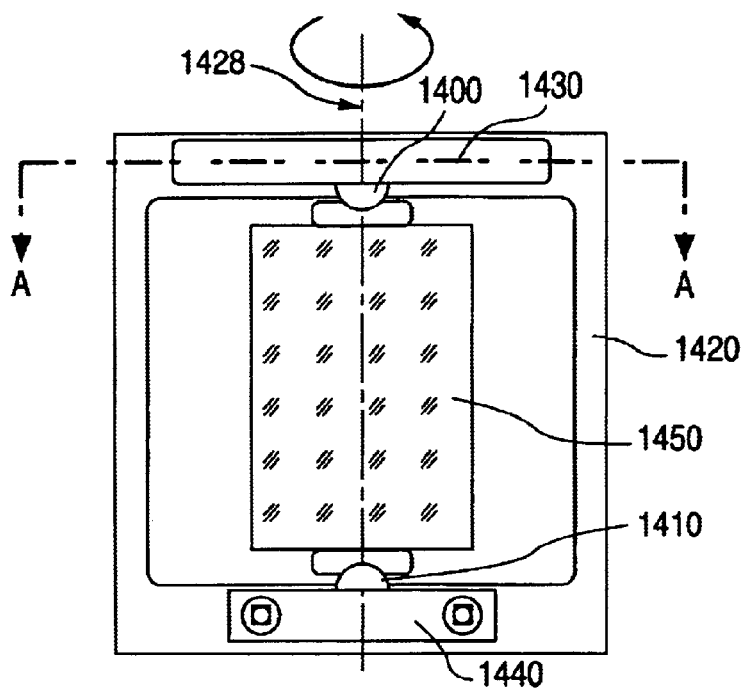
FIGS. 14a and 14b schematically illustrate a side mounted leaf spring design.
Figure 14B:
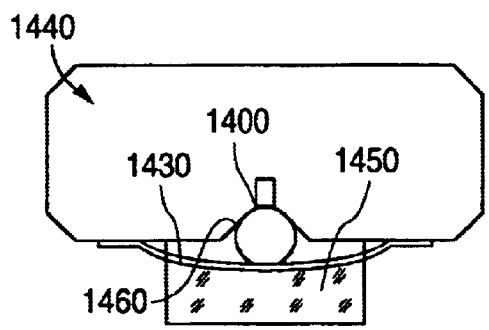

FIGS. 14a and 14b schematically illustrate an alternative embodiment to those shown and described with respect to FIGS. 12 and 13. The ball bearings 1400 and 1410 are similar to those shown and described with respect to FIG. 12. However, the ball bearings 1400 and 1410 are coupled to the housing 1420, not by top and bottom bearing shells such as top bearing shell 1240 and bottom bearing shell 1260 of FIG. 12, but rather by a side-oriented leaf spring 1430 and a side oriented clamp 1440. The OC 1450 is therefore positioned by bearing 1400 and bearing 1410 along the vertical axis 1428, while the bearings 1400 and 1410 are supported by forces from the spring 1430 and clamp 1440 that are perpendicular to the axis 1428, such that these forces coupling the bearings 1400 and 1410 to the housing 1420 do not put tremendous compression stress on the OC 1450.

FIG. 14b shows a top cross sectional view through A—A of FIG. 14a. In FIG. 14b, the bottom bearing 1410 is not shown. The surfaces 1460 for contacting the ball bearings 1400 and 1410, can be machined into the housing 1420 in one machining or chucking set up, thereby allowing for extremely high tolerances for aligning the ball bearings 1400 and 1410 along one axis. This will result in a reduction or elimination of hysteresis due to the upper bearing 1400 and the lower bearing 1410 not being properly aligned.

Figure 15:
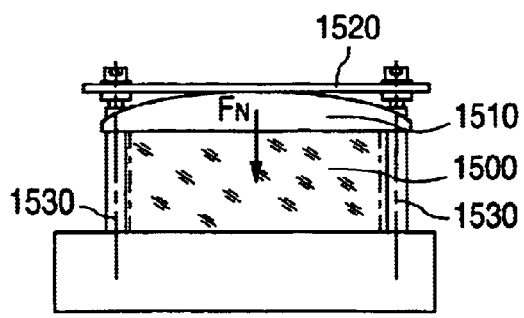
FIG. 15 schematically illustrates a low tension mounting aspect of the invention.

FIG. 15 shows a low-tension mount of a sensitive OC 1500. If there is any strain on the OC 1500, then there wavefront deformations may be caused to light traversing the OC 1500, and it is therefore desired to minimize input forces to the OC 1500. The embodiment shown in FIG. 15 provides an extensive load distribution on the OC 1500 which is preferable to a less extensive distribution, wherein a point-like load would exert the greatest force over a small area of the OC 1500. The extensive load distribution is achieved by the use of a curved contact pressure clamp 1510 which is planar or otherwise shaped like the OC 1500 where the clamp contact the surface of the OC 1500 substantially along its entire area on one side such as its top surface, as shown. The opposite side of the clamp 1510 is preferably shaped like a partly-cylindrical or partly spherical cap. A leaf spring 1520 held by two columns 1530 is used to deliver a selected and adjustable pressure force $F_N$ onto the OC 1500 is minimal exertion of pressure at any point. In this design, the influence of strain on the OC 1500 is substantially suppressed thereby suppressing wavefront deformations to the laser beam traversing the OC 1500 to better than λ/10 for combinations of two to three prisms for a KrF laser resonator or four prisms of an ArF laser resonator, such as may be included in a beam expander of a line-narrowing module of these lasers including a grating and/or an etalon. A prism or prisms of a beam expander used in a molecular fluorine laser resonator would also similarly benefit.

Figure 16A:
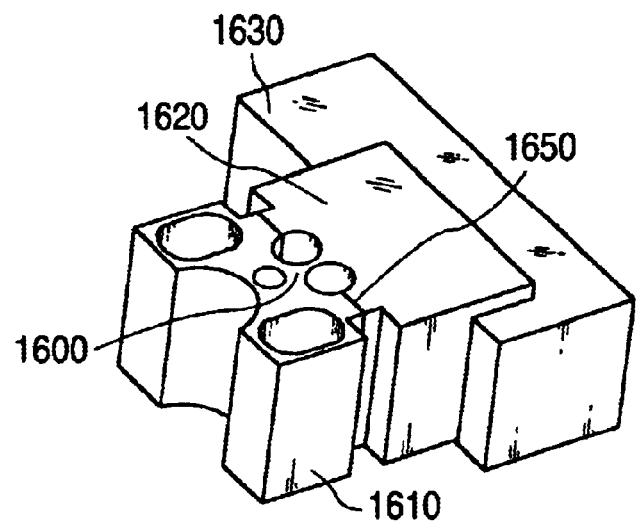
FIG. 16a shows an example of a device including a solid coupling between optics module housing and MOD.
Figure 16B:
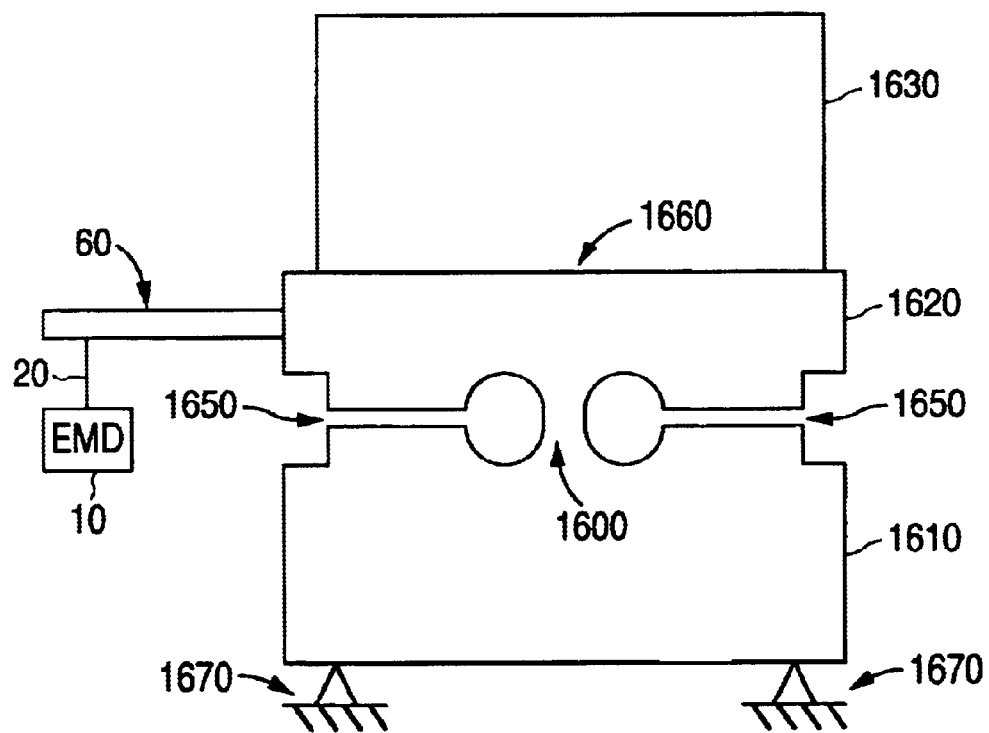

FIGS. 16a–16b illustrate another embodiment including a solid link 1600 to the module housing. The solid link 1600 has advantageous properties of elastic deformation, which allows for the rotary motion of the MOD and the linear motion of the drive element. Applying finite element analysis to the geometry of the solid link 1600 as well as knowing characteristics of the material used for the solid, such as E-module, allows for highly accurate prediction of the angular displacement, resilience and cross rigidity of the material. Referring to FIG. 16a, the solid link 1600 system comprises a first part 1610, a second part 1620 coupled to the OC 1630, wherein the first part 1610 and second part 1620 are coupled at the solid link 1600 which acts something like a hinge and further also allows for rotating movements of the OC 1630. Using such a solid link 1600 as a hinge member removes stick-slip effects caused by sliding friction of bearings used to support the MOD. The operating width of the slot 1650 between the first part 1610 and the second part 1620 may be adjusted prior to fabrication to allow for greater or lesser rotative action. The drive element preferably couples to the second part 1620, while the first part couples to the optical module housing.

FIG. 16b shows a side view of this embodiment including the solid link 1600. The EMD 10 and drive element 20 are configured for rotating the MOD 60. An optical component (1630) would be positioned on surface 1660 of the second part 1620 and the first part 1610 would be preferably coupled to the optics module housing (as illustrated by elements 1670), when the system is in place in the optics module. The first part 1610 and second part 1620 are advantageously coupled together at the solid link 1600 and having slot 1650 between them which permits the hinging action between the first and second parts 1610, 1620.

As already indicated above, while exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and structural and functional equivalents thereof.

What is claimed is:

1. An apparatus for adjusting a position of an optical component within a laser resonator, comprising:
   an electromechanical device including a drive element having a first direction of movement;
   an optical component of a laser resonator supported by a mechano-optical device, said mechano-optical device is coupled to the drive element for movement therewith, wherein the mechano-optical device has a second direction of movement different from the first direction of movement of the drive element;
   an optical component of a laser resonator supported by the mechano-optical device;
   wherein the electromechanical device adjusts the position of the optical component by moving the drive element and thereby adjusting the position of the mechano-optical device and the optical component;
   a controller for error correction of the position of the drive element, wherein the controller controls the electromechanical device;
   a position measuring device that measures a position of the drive element and forms a feedback loop that provides a signal indicative of the position of the drive element to the controller; and
   wherein the controller controls the electromechanical device to adjust the position of the drive element based on the signal provided by the position measuring device.

2. The apparatus of claim 1, wherein the electromechanical device operates between a first limit of operation and a second limit of operation, wherein between the first limit of operation and second limit of operation there are a plurality of target points each associated with a target position of the optical component, and wherein the electromechanical device always approaches a selected target point by moving in a direction away from the first limit of operation.

3. The apparatus of claim 1, wherein the drive element has a first contact surface and the mechano-optical device has a second contact surface in contact with the first contact surface, wherein the first and second contact surfaces are configured such that the drive element transmits a change of position to the mechano-optical device through a rolling contact between the first contact surface and the second contact surface.

4. The apparatus of claim 3, wherein the first contact surface has a planar face and the second contact surface has a curved face.

5. The apparatus of claim 3, wherein the first contact surface has a curved face and the second contact surface has a planar face.

6. The apparatus of claim 3, wherein the first contact surface has a concave face and the second contact surface has a rounded face.

7. The apparatus of claim 3, wherein the first contact surface has a rounded face and the second contact surface has a concave face.

8. The apparatus of claim 3, wherein both the first contact surface of the driven element and second contact surface of the mechano-optical device are composed of a low friction material.

9. The apparatus of claim 3, wherein said drive member is configured to travel in a linear direction, wherein the mechano-optical device is configured to travel in a rotary direction about a center of rotation, wherein the first and second contact surfaces are in contact at a contact point, and wherein the contact point follows a path that linear direction of the drive member is substantially tangent to an arc with its center at the center of the rotation of the mechano-optical device.

10. The apparatus of claim 1, wherein the drive element and mechano-optical device are coupled together by an elastic element.

11. The apparatus of claim 1, wherein the mechano-optical device is rotationally movable for adjusting the orientation of the optical component within the laser resonator, and wherein the mechano-optical device is rotatable about a center of gravity of the combination of the optical component and mechano-optical device.

12. The apparatus of claim 1, wherein the mechano-optical device is coupled to the drive element by a spring coupling that maintains contact between the drive element and the mechano-optical device.

13. The apparatus of claim 12, wherein said spring coupling includes a first spring and a second spring positioned on opposite sides of a contact point between the drive element and the mechano-optical device.

14. The apparatus of claim 1, wherein the mechano-optical device is coupled to the drive element by a magnetic coupling.

15. The apparatus of claim 1, wherein the optical component is supported on the mechano-optical device by a roller bearing composed of ruby.

16. The apparatus of claim 1, wherein the mechano-optical device includes:
   a housing with the optical component mounted therein, said optical component having an axis of rotation;
   a first ball bearing coupled between the housing and a first surface of the optical component;
   a second ball bearing coupled between the housing and a second surface of the optical component, said first and second ball bearings being substantially aligned along said axis of rotation; and
   a spring coupled to the housing and to one of the ball bearings for spring loading the ball bearings along the axis of rotation to provide a compliant mounting for the optical component.

17. The apparatus of claim 1, wherein the mechano-optical device includes:
   a spherical segment having a spherically curved portion and a flat portion, said flat portion having the optical component mounted thereon;
   a base configured to support the spherical segment so that the spherical segment is rotatable to move the optical component about a horizontal rotational axis;
   an external housing support; and
   a ringed bearing assembly for rotatably coupling the base to the external housing support so that the spherical segment and optical component thereon are rotatable about a vertical rotational axis.

18. The apparatus of claim 17, wherein a center of mass of the optical component is substantially aligned with both the horizontal and vertical rotational axes.

19. The apparatus of claim 1, wherein the mechano-optical device includes:
   a base for supporting a first surface of the optical component, wherein the optical component has a second surface opposite the first surface;
   a plano-curved segment having a planar surface and a curved surface, said planar surface supporting the second surface of the optical component;
   a spring contacting the curved surface of the plano-curved segment for applying a clamping force to the optical component.

20. The apparatus of claim 1, wherein the mechano-optical device includes an elastically deformable solid link in a mounting that provides a hinge member that permits limited movement of the optical component without hysteresis.

21. An apparatus for adjusting a position of an optical component within a laser resonator, comprising:
   an electromechanical device including a drive element having a first direction of movement;
   an optical component of a laser resonator supported by a mechano-optical device, said mechano-optical device is coupled to the drive element for movement therewith wherein the mechano-optical device has a second direction of movement different from the first direction of movement of the drive element;
   an optical component of a laser resonator supported by the mechano-optical device;
   wherein the electromechanical device adjusts the position of the optical component by moving the drive element and thereby adjusting the position of the mechano-optical device and the optical component;
   a controller for error correction of the position of the optical component, said controller for controlling the electromechanical device; and
   a position measuring device that measures a position of the mechano-optical device; and
   wherein the controller and the position measuring device are connected in a feedback loop, said position measuring device providing a signal indicative of a position of the mechano-optical device;
   wherein the controller controls the electromechanical device based on the signal from the position measuring device to adjust a position of the drive element and a position of the mechano-optical device and optical component.

22. The apparatus of claim 21, wherein the electromechanical device operates between a first limit of operation and a second limit of operation, wherein between the first limit of operation and second limit of operation there are a plurality of target points each associated with a target position of the optical component, and wherein the electromechanical device always approaches a selected target point by moving in a direction away from the first limit of operation.

23. The apparatus of claim 21, wherein the drive element has a first contact surface and the mechano-optical device has a second contact surface in contact with the first contact surface, wherein the first and second contact surfaces are configured such that the drive element transmits a change of position to the mechano-optical device through a rolling contact between the first contact surface and the second contact surface.

24. The apparatus of claim 23, wherein the first contact surface has a planar face and the second contact surface has a curved face.

25. The apparatus of claim 23, wherein the first contact surface has a curved face and the second contact surface has a planar face.

26. The apparatus of claim 23, wherein the first contact surface has a concave face and the second contact surface has a rounded face.

27. The apparatus of claim 23, wherein the first contact surface has a rounded face and the second contact surface has a concave face.

28. The apparatus of claim 23, wherein both the first contact surface of the driven element and second contact surface of the mechano-optical device are composed of a low friction material.

29. The apparatus of claim 23, wherein said drive member is configured to travel in a linear direction, wherein the mechano-optical device is configured to travel in a rotary direction about a center of rotation, wherein the first and second contact surfaces are in contact at a contact point, and wherein the contact point follows a path that linear direction of the drive member is substantially tangent to an arc with its center at the center of the rotation of the mechano-optical device.

30. The apparatus of claim 21, wherein the drive element and mechano-optical device are couple together by an elastic element.

31. The apparatus of claim 21, wherein the mechano-optical device is rotationally movable for adjusting the orientation of the optical component within the laser resonator, and wherein the mechano-optical device is rotatable about a center of gravity of the combination of the optical component and mechano-optical device.

32. The apparatus of claim 21, wherein the mechano-optical device is coupled to the drive element by a spring coupling that maintains contact between the drive element and the mechano-optical device.

33. The apparatus of claim 32, wherein said spring coupling includes a first spring and a second spring positioned on opposite sides of a contact point between the drive element and the mechano-optical device.

34. The apparatus of claim 21, wherein the mechano-optical device is coupled to the drive element by a magnetic coupling.

35. The apparatus of claim 21, wherein the optical component is supported on the mechano-optical device by a roller bearing composed of ruby.

36. The apparatus of claim 21, wherein the mechano-optical device includes:
   a housing with the optical component mounted therein, said optical component having an axis of rotation;

a first ball bearing coupled between the housing and a first surface of the optical component;

a second ball bearing coupled between the housing and a second surface of the optical component, said first and second ball bearings being substantially aligned along said axis of rotation; and a spring coupled to the housing and to one of the ball bearings for spring loading the ball bearings along the axis of rotation to provide a compliant mounting for the optical component.

37. The apparatus of claim 21, wherein the mechano-optical device includes:

a spherical segment having a spherically curved portion and a flat portion, said flat portion having the optical component mounted thereon;

a base configured to support the spherical segment so that the spherical segment is rotatable to move the optical component about a horizontal rotational axis;

an external housing support; and a ringed bearing assembly for rotatably coupling the base to the external housing support so that the spherical segment and optical component thereon are rotatable about a vertical rotational axis.

38. The apparatus of claim 37, wherein a center of mass of the optical component is substantially aligned with both the horizontal and vertical rotational axes.

39. The apparatus of claim 21, wherein the mechano-optical device includes:

a base for supporting a first surface of the optical component, wherein the optical component has a second surface opposite the first surface;

a plano-curved segment having a planar surface and a curved surface, said planar surface supporting the second surface of the optical component;

a spring contacting the curved surface of the plano-curved segment for applying a clamping force to the optical component.

40. The apparatus of claim 21, wherein the mechano-optical drive includes an elastically deformable solid link in a mounting that provides a hinge member that permits limited movement of the optical component without hysteresis.

* * * * *